United States Patent [19]
Pearson

[11] 3,774,570
[45] Nov. 27, 1973

[54] NON-ROTATING DEPTH CONTROLLER PARAVANE FOR SEISMIC CABLES
[75] Inventor: Raymond H. Pearson, Richardson, Tex.
[73] Assignee: Whitehall Electronics, Richardson, Tex.
[22] Filed: Jan. 25, 1972
[21] Appl. No.: 220,592

[52] U.S. Cl............................................. 114/235 B
[51] Int. Cl............................................. B63b 21/00
[58] Field of Search .................. 114/235 B; 340/7 R

[56] References Cited
UNITED STATES PATENTS
3,680,520  8/1972  Smith .............................. 114/235 B
3,375,800  4/1968  Cole et al........................ 114/235 B Primary Examiner—Milton Buchler
Assistant Examiner—Stuart M. Goldstein
Attorney—Thomas B. Van Poole et al.

[57] ABSTRACT

A non-rotating depth controller paravane for seismic cable streamers wherein the paravane includes a body having a central bore extending the length thereof through which the seismic cable extends with the paravane latched in non-rotatable relation to the seismic cable. The paravane includes three or more pivotally mounted diving planes, four being shown in the illustrated example, and electronic circuitry and servo means for sensing differences between a command signal and a depth indicating signal derived from a pressure transducer on the paravane and activating the servo system to position the diving planes to cause the paravane to climb or dive regardless of its orientation about the roll axis and without movement of the paravane in yaw. Gravity sensing potentiometers vary the control signals to the servo system to activate the diving planes in this manner regardless of the orientation of the paravane about the roll axis.

13 Claims, 15 Drawing Figures

NON-ROTATING DEPTH CONTROLLER PARAVANE FOR SEISMIC CABLES

BACKGROUND AND OBJECTS OF THE INVENTION

The present invention relates in general to marine seismic cable systems having means for maintaining the seismic cable or seismic streamer at a pre-determined depth, and more particularly to a paravane structure adapted to be non-rotatably linked to the seismic cable streamer at a plurality of regular intervals to maintain the streamer at a selected depth and which responds to depth command signals from the towing vessel to regulate the streamer depth notwithstanding rotation or twisting of the cable and the paravanes linked thereto.

Heretofore, various systems have been devised for maintaining the hydrophones or transducers in a seismic cable or streamer at selected depths when used in marine seismic operations. In general, the seismic cable or streamer may constitute a seismic detector cable constructed substantially as disclosed in U.S. Pat. No. 2,465,699 issued Mar. 29, 1949 to Leroy C. Paslay. A marine seismic detector cable may in many cases be a mile or more in length, and the efficiency of the seismic survey is affected to a large degree by the ability to maintain the various hydrophones along the length of the cable at the same pre-determined depth.

Efforts have been made to maintain the cable at a selected pre-determined depth in the water, while the cable is being towed by the surveying vessel, by using a plurality of weights associated with the cable at spaced intervals to make the cable negatively buoyant and by associating flotation means with the cable to assist in maintaining the cable at the desired depth. More recently, paravane structures such as that disclosed in U.S. Pat. No. 3,375,800 to Jimmy R. Cole et al. or the type disclosed in U.S. Pat. No. 3,412,704 to Buller et al., have been proposed for regulating the depth of the seismic cable. Such depth controllers have been rotatably secured to the cable by bearing means and have employed two diving planes, which are regulated in preselected relation to pressure responsive devices in the wall of the paravane to maintain a desired depth. Such prior art depth controllers, employing two diving planes, must always be positioned so that the two diving planes are horizontal, which is insured by the weighted, rotatable construction disclosed in such prior patents.

It has been found highly desirable to provide non-rotatable depth controllers which are not alined in any particular plane, as the seismic streamer cable twists under tension and each depth controller may be affected by the twisting of the streamer cable to cause the depth controllers to operate in different planes.

An object of the present invention, therefore, is the provision of a paravane type depth controller for use with seismic cables or streamers, wherein the paravane depth controller employs three or more diving planes which are regulated by servo systems carried in the paravane and subject to command signals from the towing vessel, and wherein the paravane is non-rotatably secured to the cable to maintain the adjacent portion of the cable at a preselected depth.

Another object of the present invention is the provision of a depth controller paravane to maintain a seismic cable or streamer at a desired depth, wherein the depth controller has three or more diving planes and control means to provide vertical or horizontal thrusts as needed to cause the depth controller to maintain a desired depth or to cause it to climb or go deeper in response to command signals.

Another object of the present invention is the provision of a depth controller for seismic cables or streamers as described in either of the two preceding paragraphs, together with transformer means for communicating with the seismic cable and means for providing pressure transducer readout to the towing vessel to permit monitoring of the towing depth.

Other objects, advantages and capabilities of the present invention will become apparent from the following detailed description, taken in conjunction with the accompanying drawings illustrating preferred embodiments of the invention.

BRIEF DESCRIPTION OF THE FIGURES

FIG. 3 is a longitudinal section view of the depth controller taken along the line 3—3 of FIG. 2;

FIG. 4 is a top plane view showing the two halves of the paravane opened away from each other about their interconnecting hinge;

FIG. 9 is a section view of one of the gear box units directly connected to the control shafts of the diving planes;

FIG. 10 is a side elevation of the connected pair of gravity actuated potentiometers;

DETAILED DESCRIPTION OF PREFERRED EMBODIMENTS

Figure 1:
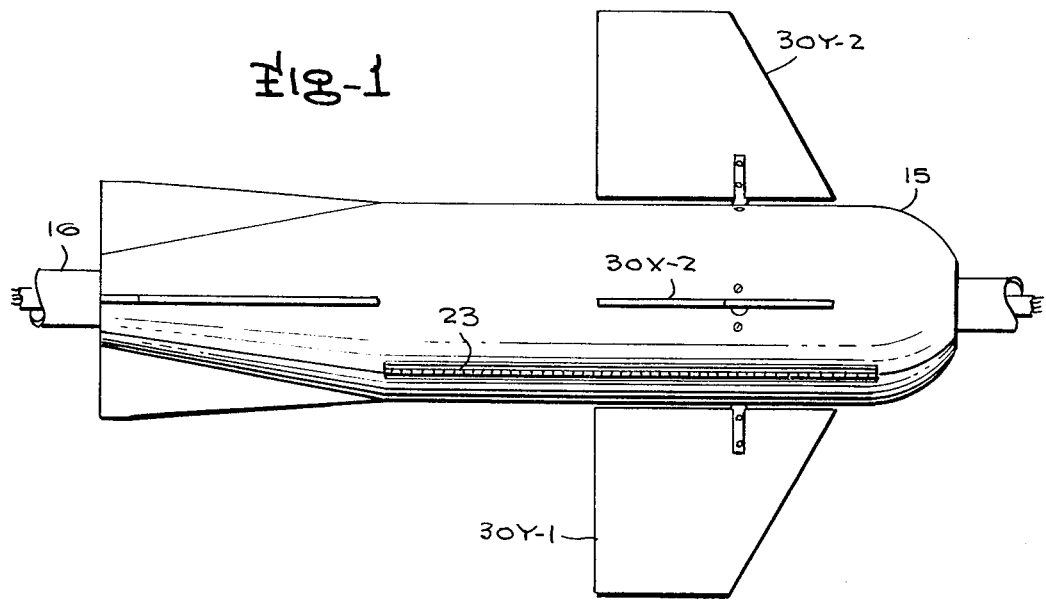
FIG. 1 is a side elevation view of the paravane depth controller for a seismic cable or streamer, constructed in accordance with the present invention.
Figure 2:
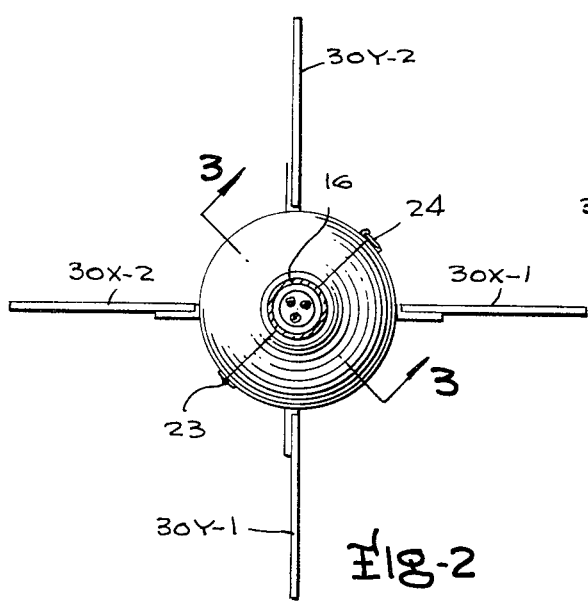
FIG. 2 is a front elevation view of the paravane depth controller.
Figure 5:
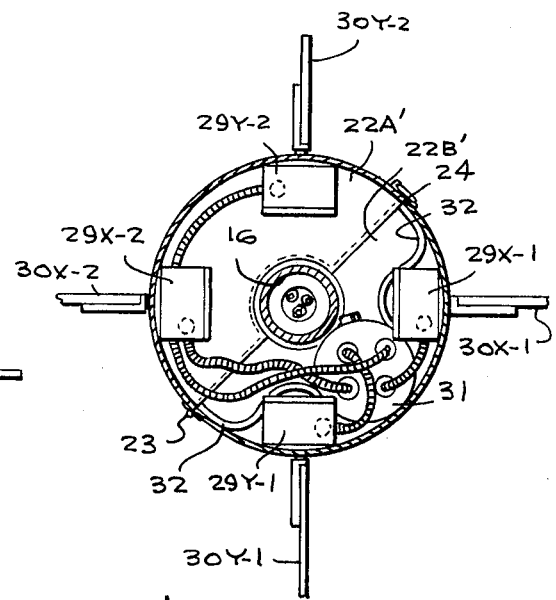
FIG. 5 is a vertical transverse section view taken along the line 5—5 of FIG. 3, with the diving planes removed from their control shafts.
Figure 6:
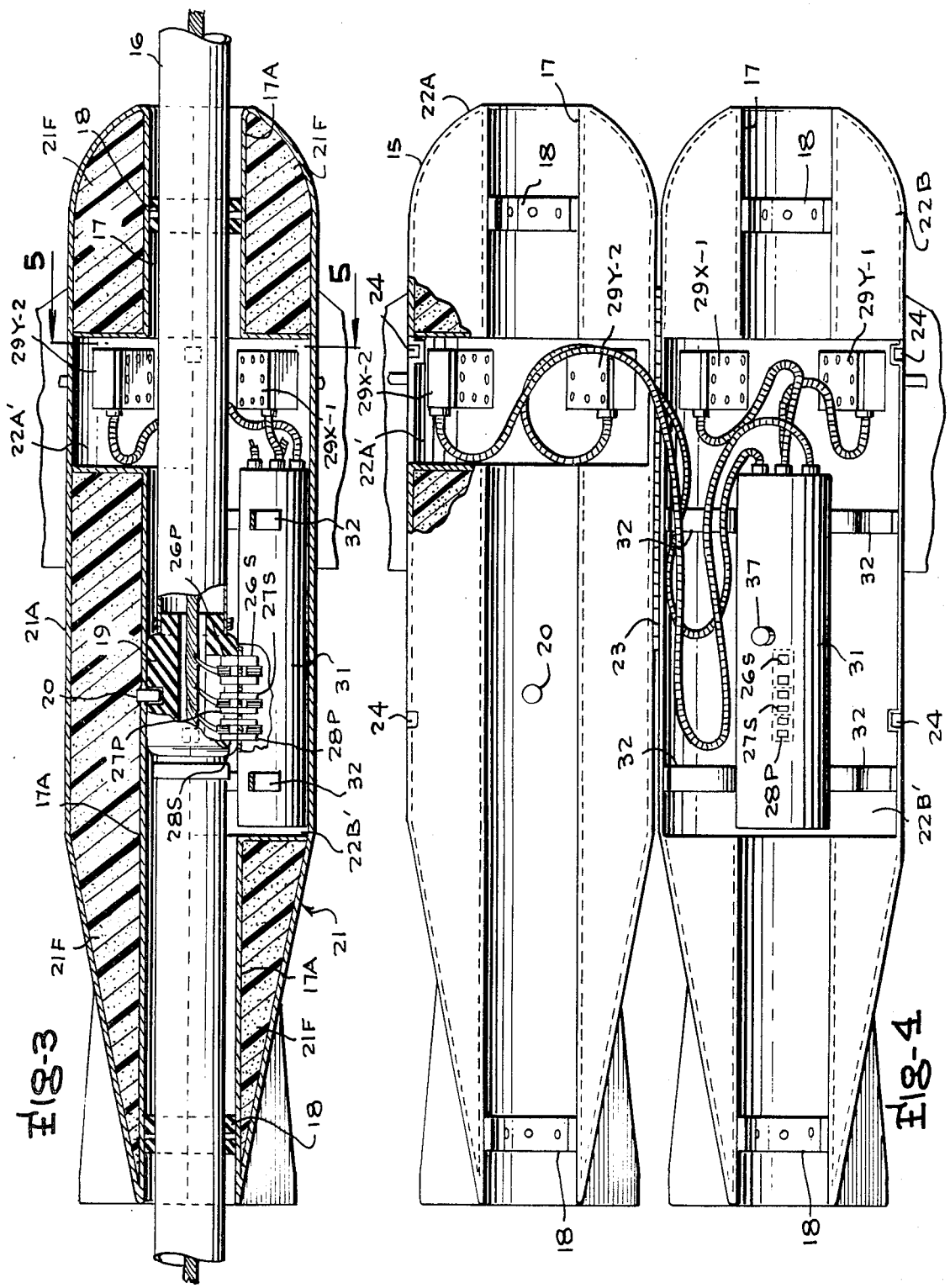
FIG. 6 is a front view, to enlarged scale, of the sealed cylinder which houses the electronics and servo motors, with certain internal components indicated in broken lines.

Referring to the drawings, wherein like reference characters designate corresponding parts throughout the several figures, and particularly to FIGS. 1 through 7, there is illustrated a paravane 15 which is non-rotatably secured about a seismic cable or streamer indicated at 16 in FIG. 3. The paravane 15 has a central, axial bore 17 through which the seismic cable or streamer 16 is received, and is provided with bushings 18 within the bore near the leading and trailing ends thereof. As is more clearly illustrated in FIG. 3, a special spacer 19 is incorporated into the streamer cable, which is of slightly enlarged diameter relative to the diameter of the cable to correspond closely to the diameter of the bore 17 and includes a socket for receiving a pin 20 projecting inwardly into the bore to provide the tow point for the depth controller and retain the depth controller in non-rotating relation to the cable. The spacer 19 also mounts the primaries of two transformers and the secondary of another transformer as later described.

The paravane 15 includes a torpedo-like hull or body 21 formed preferably of a pair of axially spaced inner cylindrical wall portions 17A concentric with the hull axis and forming the axial bore 17, and an outer wall 21A which tapers inwardly at the leading and trailing ends to join the inner wall portions 17A. The hull is preferably built in two halves, indicated generally at 22A and 22B, joined together along one edge by a piano hinge 23 and a plurality of conventional latches 24, to facilitate installation of the depth controller on the seismic cable or streamer. The hull sections 22A and 22B, and the bushings 18, may be made of vacuum formed plastic material, or of metal, and are arranged to define an elongated compartment 22B' in the hull section 22B and a shorter compartment 22A' in the hull section 22A which registers with the forwardmost portion of the compartment 22B'.

The special spacer 19 incorporated in the streamer cable, as previously mentioned, includes the primary windings and primary core section 26-P of transformer 26, the primary winding and primary core section 27-P of transformer 27, and the secondary winding and secondary core section 28-S of transformer 28. The leads from the transformer primary 26-P extends through the cable and connect to the AC power source in the towing vessel to provide an AC power supply to the depth controller circuit, and the leads from the transformer primary 27-P extend through the cable and connect to a suitable command signal transmitter or generator in the towing vessel to provide the command signal input to the depth controller. The leads from the transformer secondary 28-S extend through the cable 16 to a conventional depth readout device on the towing vessel for the purpose of monitoring the depth of the controller.

The spaces within the hull 21 other than the compartments 22A' and 22B' are preferably filled with a suitable closed cell foam material, indicated at 21F to cause the complete depth controller to have nearly neutral buoyancy. Sealed gear boxes having a construction as later described, indicated by the reference characters 29-X1, 29-X2, 29-Y1 and 29-Y2 are mounted on the outer wall 21A of the hull in the compartment 22A' and the forward portion of the compartment 22B' at positions spaced 90° apart to control diving planes 30-X1, 30-X2, 30-Y1, and 30-Y2 projecting outwardly from the hull 21 along radial axes perpendicular to the cable axis. The electronics for the depth controller and the servo motors for driving the gear boxes controlling the diving planes are housed in a sealed cylinder 31 located in the compartment 22B', having curved spring arms 32 which support the sealed cylinder assembly 31 within the compartment 22B' and, together with the guide pin 20, insure that the cylinder assembly 31 is in a preselected position in its compartment. The sealed cylinder assembly 31 contains the secondary windings and core sections 26-S and 27-S of transformers 26 and 27 and the primary windings and cor section 28-P of transformer 28, located so as to mate with their corresponding primary and secondary core sections mounted in the spacer 19 when the cylinder assembly 31 is properly positioned in the compartment 22B' by the pin 20 and the springs 32.

Figure 7:
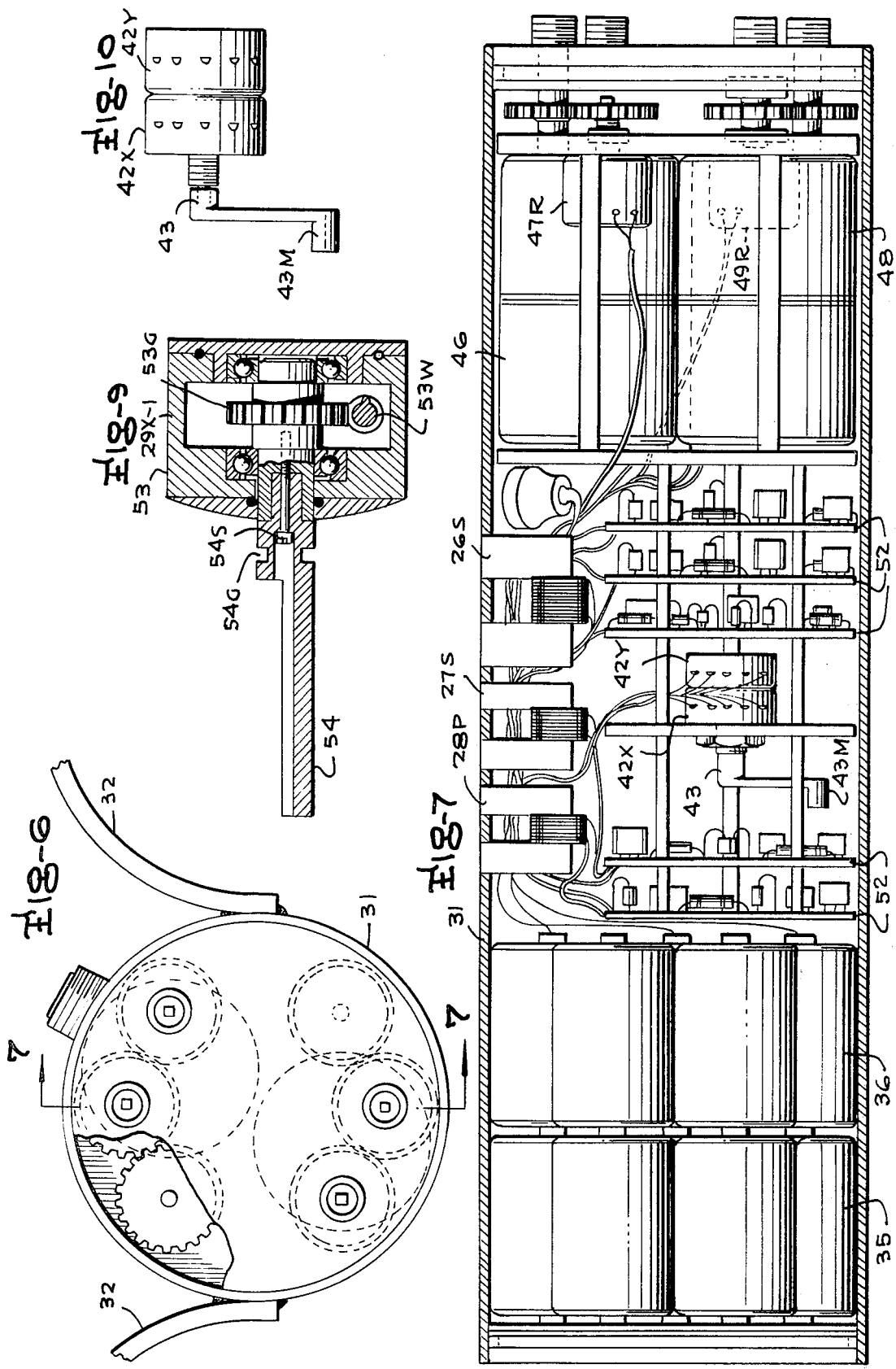
FIG. 7 is a longitudinal section view through the sealed cylinder, taken along the line 7—7 of FIG. 6.
Figure 8:
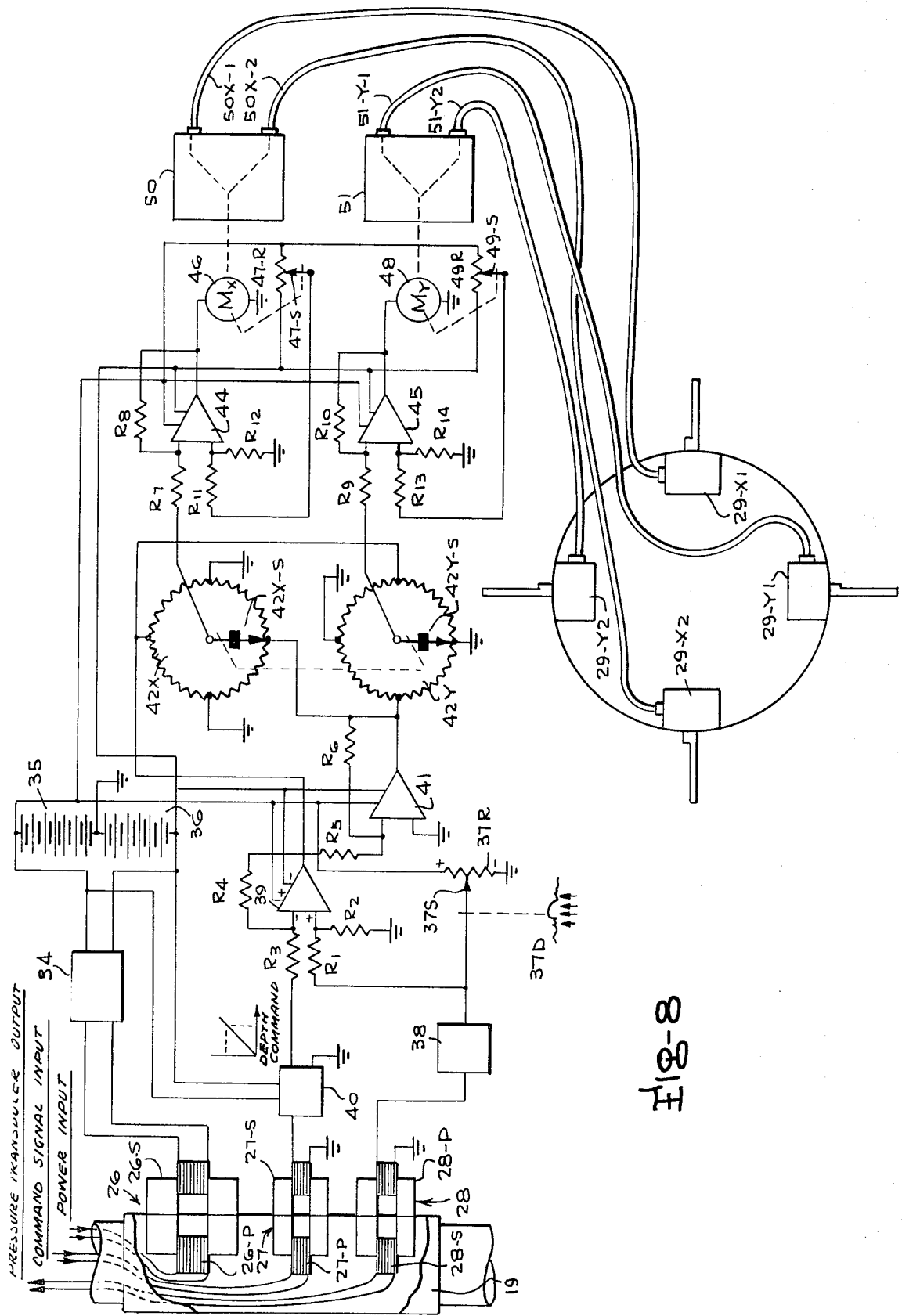
FIG. 8 is a schematic diagram of the electrical circuitry of the depth controller paravane.

The electrical and electronic circuitry incorporated in the sealed cylinder assembly 31 will be more clearly understood by reference to the schematic diagram of FIG. 8. As there shown, the AC supply conducted through the leads of the cable 16 to the transformer primary 26-P is transformed to a suitable voltage level and applied by the secondary 26-S to the battery charge 34 formred of a conventional rectifier/regulator circuit. The battery charger 34 is connected to two battery packs, indicated generally at 35 and 36, consisting for example of seven batteries each with their mid points connected to a common ground. These battery packs 35 and 36 may be conveniently arranged in the form of a center battery and six circumferentially spaced batteries contacting and located in a cylindrical path about the center battery, producing generally cylindrical, seven battery packs as indicated at 35 and 36 in FIG. 7 located within the cylinder 31. The battery packs 35 and 36 provide the power to operate the electronic and servo systems, and provide the advantage that should the AC supply signal to the transformer 26 become intermittant, the depth controller would not be adversely affected. As an alternative, the circuit may be powered by using a suitable power supply in place of the batteries and charger, consisting of a rectifier/regulator circuit having two outputs.

A pressure transducer 37 is provided in the cylinder assembly 31 for the purpose of indicating the depth at which the controller is operating at any given instant. The pressure transducer 37 in the illustrated embodiment is of the potentiometric type having an electrical resistance element 37R and a slider 37S coupled to a diaphragm 37D exposed thorugh an opening in the wall of the cylinder 31 to the hydrostatic pressure of the water body in which the controller is operating. Of course other types of pressure transducers can be used if desired. One side of the electrical resistance element 37R is connected to common ground, while the other side is connected to the battery pack 35. Thus a voltage output appears on the slider 37S which is proportional to the hydrostatic pressure acting on the diaphragm 37D. The voltage thus obtained on the slider 37S is connected to a voltage controlled oscillator 38 of an ordinary and conventional type, whose output frequency is proportional to the voltage on the slider 37S. The output of the voltage controlled oscillator 38 connects to the primary 28-P of the transformer 28, so that a signal representing the output of the voltage controlled oscillator 38 signifying the depth of the controller is carried from the second 28-S of the transformer 28 through the cable 16 to the towing vessel to operate the depth readout device and indicate the depth of the controller. This eliminates the need for separate depth transducers in the streamer cable, which has been commonly practiced.

The depth signifying voltage at the slider 37S is also applied through an isolating resistor R1 and across resistor R2 to one input of a differential operational amplifier 39. A depth command signal coming from the towing vessel is connected to the primary 27-P of the transformer 27 whose secondary is connected to the input of a demodulator 40 which may be of an ordinary FM discriminator type if the depth command signal is an FM signal. Other types of modulation, and suitable demodulators, may be employed if desired, the main requirement being that the modulation signal not interfere with the seismic signals. A low level FM signal is well suited for this purpose. The output $E_c$ of the demodulator 40 is a D. C. voltage proportional to the depth command signal supplied to the transformer 27, and is connected through an isolating resistor R3 as the other input of the differential operational amplifier 39. The differential amplifier 39 has the usual feedback resistor R4 connected between its output and its inverting input, and, as shown in FIG. 8, in the illustrated example the demodulator 40 connects to the inverting input of amplifier 39 and the slide 37S of the pressure transducer connects to the non-inverting input of amplifier 39. Thus if $E_c$ from the demodulator 40 is larger than $E_t$ (the voltage from the pressure transducer slide 37S), a negative output $E_a$ results from the differential amplifier 39. Conversely, if the voltage $E_t$ is larger than $E_c$, a positive output $E_a$ results. The magnitude of $E_a$ depends upon the difference between $E_c$ and $E_t$. If $E_c$ and $E_t$ are equal, $E_a$ is zero.

By way of example, if the depth controller circuit is commanded to go deeper than it is actually running as indicated by the pressure transducer output $E_t$ from the slide 37S, $E_c$ will be larger than $E_t$ and $E_a$ will swing negative, the magnitude depending on the difference between $E_c$ and $E_t$. Conversely, if the depth controller circuitry is commanded to go shallower than it is actually running, $E_t$ will be larger than $E_c$ and $E_a$ will swing positive. It will thus be seen that the voltage $E_a$ provided at the output of the differential amplifier 39 provides a voltage which may be used to control a servo system capable of moving the necessary control surfaces.

In as much as two servo systems are to be employed, one for operating what may be labeled the X axis or horizontal axis diving planes 30-X1 and 30-X2 and the other for operating what may be arbitrarily labeled the Y axis or vertical diving planes 30-Y1 and 30-Y2, an inverting operational amplifier 41 is provided. The non-inverting input to this operational amplifier 41 is connected to ground, and the inverting input is connected through the isolating resistance R-5 to the output $E_a$ of the operational amplifier 39. The usual feedback resistor R-6 is provided between the output $E_b$ and the inverting input for the operational amplifier 41 and the amplifiers designed to having unit gain. Thus $E_b$, the output of the inverting amplifier 41, is always equal in magnitude and opposite in polarity to $E_a$, the output of the operational amplifier 39.

The outputs $E_a$ and $E_b$ of the operational amplifiers 39 and 41 are connected in the manner illustrated to oppositely located portions of the resistors of ganged, gravity actuated potentiometers 42X and 42Y. For example, the voltages $E_a$ and $E_b$ connect to diametrically opposite points on the resistor of potentiometer 42X, while diametrically opposite points on this resistor located 90° from the first mentioned connection points are connected to ground. The frames rigidly supporting the resistors of the gravity actuated potentiometers 42X and 42Y are rigidly mounted to the framework of the sealed cylinder 31 which is in turn rigidly mounted in the depth controller, while the sliders 42X-S and 42Y-S are connected to a shaft, indicated at 43 in FIG. 10 having an eccentric mass 43M fixed to the end thereof, to always maintain the sliders 42X-S and 42Y-S in a fixed position irrespective of the rotational position of the controller. It is, of course, assumed that the streamer axis and therefore the controller axis is reasonably horizontal. The purpose of the potentiometers 42X and 42Y is to provide inputs $E_{px}$ $E_{py}$ of proper polarity and magnitude to the two servo systems.

As shown in the schematic diagram of FIG. 8, the input $E_{px}$ from the slider 42X-S of gravity actuated potentiometer 42X is applied through isolating resistor R-7 to the inverting input of operational amplifier 44 having a feedback resistor R-8 connected between its output and its inverting input. Similarly, the voltage $E_{py}$ from potentiometer 42Y is applied through isolating resistor R-9 to the inverting input of operational amplifier 45, having a feedback resistor R-10 connected between its output and inverting input. The output of operational amplifier 44 is applied to a servo motor 46 which drives the slider 47S of a follow potentiometer 47R, the slider being connected to supply a voltage $E_{fx}$ through an isolating resistor R-11 and across resistor R-12 to the non-inverting input of amplifier 44. The output of operational amplifier 45 is connected to servo motor 48 having a slider 49S of follow potentiometer 49R driven by the servo motor 48 for applying an error voltage $E_{fy}$ through isolating resistor R-13 and across resistor R-14 to the non-inverting input of operational amplifier 45. The servo motors 46 and 48 drive gear boxes 50 and 51 which are integral to the servo motors 46 and 48 and drive flexible output shafts 50-X1 and 50-X2 from gear box 50 and 51-Y1 and 51-Y2 from gear box 51. The outputs on the flexible shafts 50-X1 and 50-X2 are 180° out of phase with each other, as are the outputs on shafts 51-Y1 and 51-Y2. The flexible shafts in turn drive gear boxes 29-X1, 29-X2, 29-Y1 and 29-Y2 connected to the driving planes.

As will be apparent from FIG. 7, the sealed cylinder 31 provides a compact assembly of the battery packs 35 and 36 adjacent one end of the cylinder, with the pressure transducer 37 and the transformer secondaries 26-S and 27-S, and the transformer primary 28-P mounted in the center section of the cylinder 31 with the various electronic components mounted on circuit boards 52 and the gravity controlled potentiometers 42X and 42Y all housed in the center portion of the cylinder. The other end portion of the cylinder houses the servo drive motors 46 and 48, together with suitable output gears driving follow potentiometers 47R and 49R and four output shafts which are sealed so as to not allow water to leak into the cylinder 31.

The flexible shafts 50-X1 and 50-X2, and 51-Y1 and 51-Y2 connect the outputs X1, X2 and Y1, Y2 to the gear boxes 29-X1, 29-X2, 29-Y1 and 29-Y2 which are of identical construction and one of which is illustrated in section in FIG. 9. Referring to FIG. 9, the gear box 29-X1 includes a housing 53 providing a sealed case for a simple worm gear mechanism including a worm 53W fixed to the end of the flexible output shaft, such as flexible shaft 50-X1, and a worm wheel or worm gear 53G journaled in the housing 53 on a shaft which is connected to a diving plane control shaft 54 in a suitable manner, for example by the screw 54S. In the preferred embodiment, the diving planes 30 are fastened to the flat portion of respective shafts pivot 54 in any conventional manner, as by fastening screws extending laterally through the diving planes and into their associated shafts pivot 54, and the pivot shaft 54 may be a hardened shaft having a circumferential groove 54G adjacent its base to permit the shaft to break off in case an obstruction is encountered, thus protecting the gear box 53 from internal damage. In the illustrated embodiment, the pivot shafts 54 support the diving planes 30Y-1 and 30Y-2 for angular movement about a common pivot axis which is alined with a diameter of the paravane body and the pivot shafts 54 for the other pair of diving planes 30X-1 and 30X-2 support them for movement about another pivot axis which extends diametrically of the paravane body and is at right angles to the axis of the shafts for the diving planes 30Y-1 and 30Y-2.

It will be apparent that the non-rotatable depth controller paravanes of the present invention are not alined in any particular radial plane or angular position relative to the streamer axis, because the streamer cable to which each paravane is linked by the connecting pin 20 twists under tension and causes different depth controllers to occupy different angular positions. FIGS. 11, 12, 13 and 14 are diagrammatic rear views of the depth controller paravane in four possible angular positions of orientation about the streamer cable axis, and illustrating the potentiometers 42X and 42Y diagrammatically to facilitate explanation of the action of the depth controller circuitry.

Figure 11:
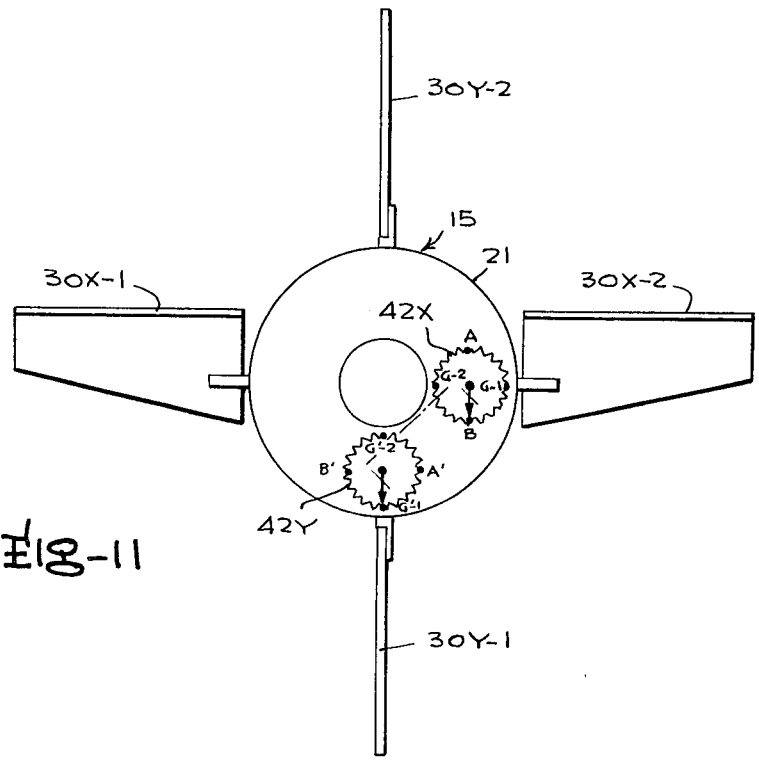
FIGS. 11, 12, 13 and 14 are rear views of the depth controller paravane in four different possible positions, with the gravity actuated potentiometers schematically indicated thereon.

FIG. 11 illustrates the depth controller paravane in a first possible position wherein the diving planes 30-X1 and 30-X2 are located in a horizontal plane and the diving planes 30-Y1 and 30-Y2 are in the vertical plane. Assuming that the cable streamer and the depth controller paravane 15 are running shallower than the command depth, the output $E_t$ from the pressure transducer 37 will be smaller than the demodulator output $E_c$ from demodulator 40. Inasmuch as the demodulator output $E_c$ connects to the inverting input of operational amplifier 39, its output $E_a$ will swing negative. Since the output $E_a$ is connected to the inverting input of the second operational amplifier 41, its output $E_b$ will swing positive. Therefore the voltage $E_{py}$ from the slider 42Y-S of the potentiometer 42Y will be zero because the slider is resting in contact with the grounded tap designated G1'. The voltage $E_{px}$ will swing positive because the slider 42X-S of potentiometer 42X is resting at tap B illustrated in FIG. 8 to which the voltage $E_b$ is applied from the output of operational amplifier 41.

Since the voltage $E_{px}$ is applied to the inverting input of operational amplifier 44, a negative voltage is applied to the servo motor 46, causing it to rotate clockwise which moves the diving planes 30-X1 and 30-X2 to a diving attitude wherein their leading edge is spaced downwardly from the horizontal plane through the center axis of the paravane and through the center axis of the diving plane shafts 54 for these diving planes. The extent of the diving attitude depends on the magnitude of difference between the voltages $E_c$ and $E_t$. The diving planes 30-X1 and 30-X2 will continue to move until the voltage $E_{fx}$, which is the error signal fed back from the slider of follow potentiometer 47R to the non-inverting input of operational amplifier 44, equals the voltage $E_{px}$. At this point, the servo motor 46 stops because the output from operational amplifier 44 goes to zero. As the depth controller paravane dives to a deeper depth, the voltage $E_t$ from the pressure transducer becomes increasingly larger, and a reverse of the above action takes place gradually. Thus as the voltage $E_{px}$ gradually becomes less positive, the error feedback voltage $E_{fx}$ temporarily exceeds the voltage $E_{px}$. Since the voltage $E_{fx}$ is connected to the non-inverting input of operational amplifier 44, its output swings positive, and the servo motor 46 rotates in the counterclockwise direction until the voltage $E_{fx}$ equals the voltage $E_{px}$, which reduces the angle of attack of the diving planes 30-X1 and 30-X2. In the process of time, the voltages $E_t$ and $E_c$ become the same magnitude, and the servo motor 46 stops with the diving planes 30-X1 and 30-X2 in a neutral position. Obviously, when the diving planes 30-X1 and 30-X2 are horizontal, the diving planes 30-Y1 and 30-Y2 remain neutralized and the horizontal diving planes control the operating depth.

Figure 12:
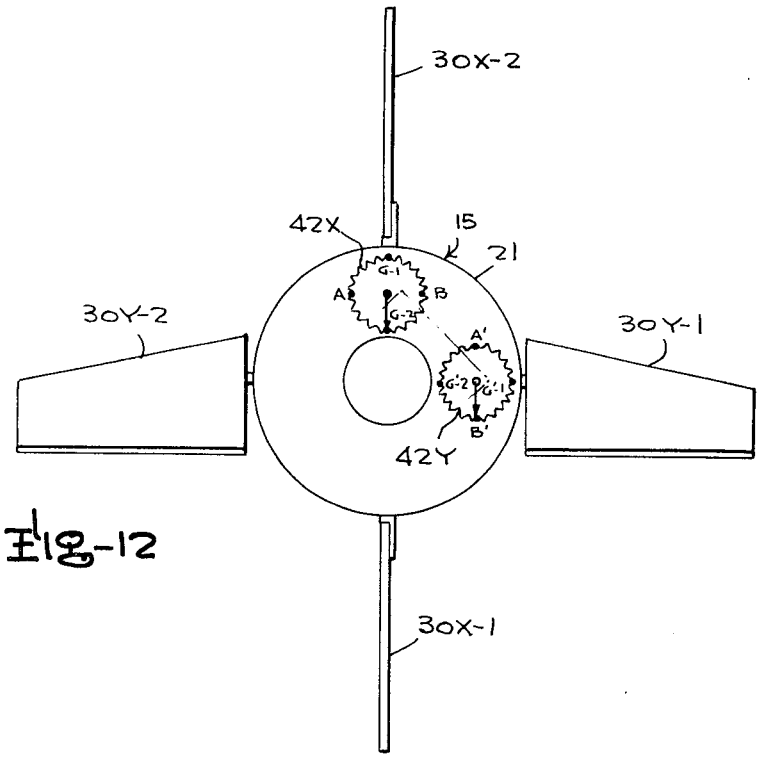

FIG. 12 illustrates the situation where the diving planes 30-X1 and 30-X2 are in the vertical plane and the diving planes 30-Y1 and 30-Y2 are in the horizontal plane, and the paravane needs to rise to a shallower depth. Assuming that the streamer and the depth controller paravane 15 are running deeper than the command depth, the pressure transducer output $E_t$ is larger than the demodulator output $E_c$. Inasmuch as the voltage $E_t$ is connected to the non-inverting input of the operational amplifier 39, its output $E_a$ will swing positive. Since the output $E_a$ is connected to the inverting input of the second operational amplifier 41, the output $E_b$ from the latter will swing negative. The voltage $E_{px}$ from the potentiometer 42X will be zero because its slider 42X-S is resting in contact with the grounded tap G2. The voltage $E_{py}$ from the potentiometer 42Y will swing negative because its slider 42Y-S is resting on the tap indicated at B'. Since the voltage $E_{py}$ is applied to the inverting input of operational amplifier 45, a positive voltage is supplied to the servo motor 48, causing it to rotate counterclockwise which moves the diving planes 30-Y1 and 30-Y2 to a climbing attitude wherein their leading edges 30' are spaced above the horizontal plane through the rotational axes of the diving planes. The extent of the climbing attitude depends on the magnitude of difference between the voltages $E_t$ and $E_c$. The diving planes 30-Y1 and 30-Y2 will continue to move until the error feedback voltage $E_{fy}$ from the follow potentiometer 49R equals the voltage $E_{py}$. At this point the servo motor 48 stops because the output from operational amplifier 45 goes to zero. As the depth controller paravane 15 now climbs to a shallower depth, the voltage $E_t$ from the pressure transducer becomes increasingly smaller, and a reverse of the above action takes place gradually. Thus as the voltage $E_{py}$ gradually becomes less negative (more positive), the voltage $E_{fy}$ temporarily exceeds the voltage $E_{py}$. Since the voltage $E_{py}$ is connected to the non-inverting input of amplifier 45, its output swings negative, and the servo motor 48 rotates in the clockwise direction until the voltage $E_{fy}$ equals the voltage $E_{py}$, which reduces the angle of attack of the diving planes 30-Y1 and 30-y2. In the process of time, the voltage $E_t$ and $E_c$ become the same magnitude, and the servo motor 48 stops with the diving planes 30-Y1 and 30-Y2 in a neutral position. The vertical diving planes 30-X1 and 30-X2 remain neutralized during the above described operation, and the diving planes 30-Y1 and 30-Y2 control the operating depth.

Figure 13:
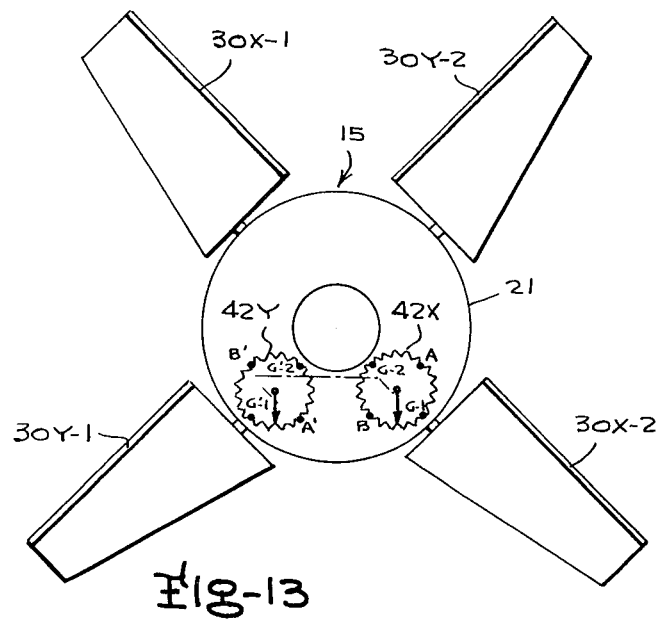

FIG. 13 illustrates a position of the paravane 15 wherein all of the diving planes are at an approximately 45° angle from the vertical or horizontal and the paravane is commanded to dive to a lower depth. Assuming the controller has been commanded to dive to some selected depth, the demodulator output $E_c$ is therefore larger than the pressure transducer output $E_t$, and since $E_c$ is connected to the inverting input of operational amplifier 39, the output $E_a$ swings negative. Inasmuch as the output $E_a$ connects to the inverting input of operational amplifier 41, its output voltage $E_b$ swings positive.

It will be observed from the schematic illustrations of the potentiometers 42X and 42Y in FIG. 13 that the slider 42X-S rests about midway between the taps B and G1 on potentiometer 42X, and that the slider 42Y-S rests about midway between the taps A' and G1' on potentiometer 42Y. Since the voltage $E_b$ went positive due to the command signal, the voltage $E_{px}$ also swings positive to about one-half the value of $E_b$. This of course is due to the position of the slider 42X-S. Since the voltage $E_{px}$ is connected to the inverting input of operational amplifier 44, its output across the servo motor 46 swings negative causing the motor 46 to rotate clockwise which causes the diving planes 30-X1 and 30-X2 to assume a diving attitude. Since the voltage $E_a$ went negative due to the command signal, the voltage $E_{py}$ will swing about one-half as negative due to its position on the potentiometer 42Y-S. Since the voltage $E_{py}$ is connected to the inverting input of operational amplifier 45, its output across the servo motor 48 swings positive, and the servo motor 48 rotates counterclockwise cause diving planes 30-Y1 and 30-Y2 to also assume a diving attitude. The operation from this point forward is the same as in the two preceding cases, in that when the depth controller paravane reaches the command depth, all of the diving planes neutralize. In the arrangement just described with the rotational axes of the diving planes disposed at 45° positions to the horizontal and vertical, all of the diving planes rotate an equal amount.

Figure 14:
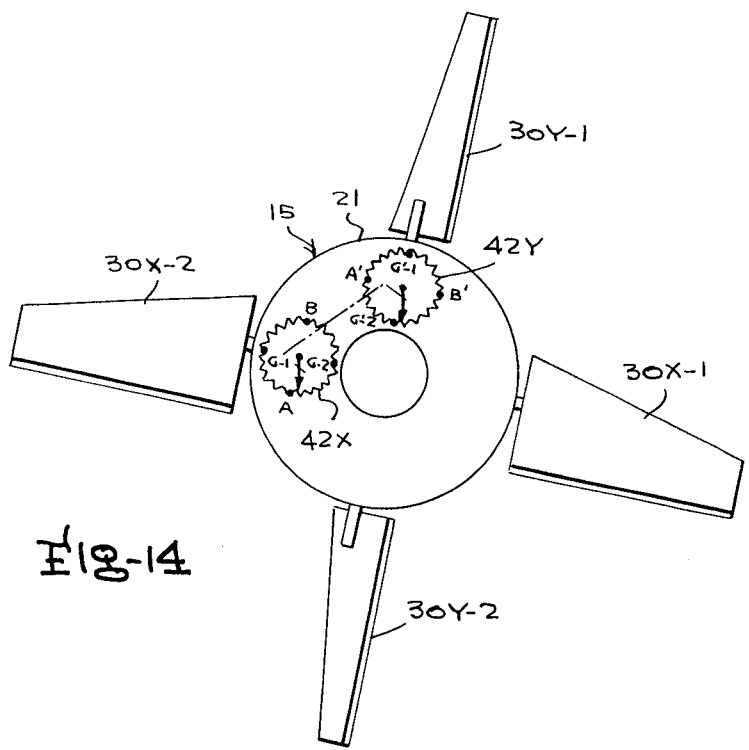

FIG. 14 illustrates an example wherein the depth controller paravane 15 is rotated to a position such that the radial axis, or axis of rotation, of the diving planes 30-Y1 and 30-Y2 is displaced about 10° from the vertical, and the paravane is required to climb to a shallower depth. It will be obvious that in this condition the diving planes 30-X1 and 30-X2 will principally control the dive/climb attitude because they are so close to being horizontal. However, there will be some right side thrust component because there is a slight 10° right bank involved. Therefore, the diving planes 30-Y1 and 30-Y2 must compensate for this right thrust with an equal left thrust. At this angle, the diving planes 30-Y1 and 30-Y2 contribute very little to the dive/climb capability.

When the climb command is transmitted to the depth controller, the pressure transducer output $E_t$ becomes larger than the voltage $E_c$ and the voltage $E_a$ swings positive while the voltage $E_b$ swings negative. Since the slider 42X-S is resting at about 10° from the tap A in the direction of the tap G2, the voltage $E_{px}$ is about 89 percent as positive as the voltage $E_a$, and since it is connected to the inverting input of operational amplifier 44, a negative voltage is applied across the servo motor 46 resulting in counterclockwise rotation and a climbing attitude of diving planes 30-X1 and 30-X2. Similarly, since the slider 42Y-S is resting about 10° from the tap G2' on potentiometer 42Y, the voltage $E_{py}$ is about 11 percent as negative as the voltage $E_b$. Since the voltage $E_{py}$ connects to the inverting input of operational amplifier 45, a positive voltage is applied to the servo motor 48 resulting in a counterclockwise rotation and a left thrust attitude being applied to the diving planes 30-Y1 and 30-Y2. The servo motor 48 does not rotate very far until the voltage $E_{fy}$ equals the voltage $E_{py}$ and rotation stops as before. In the process of time, all of the diving planes will neutralize as previously described when the paravane reaches the command depth.

Figure 15:
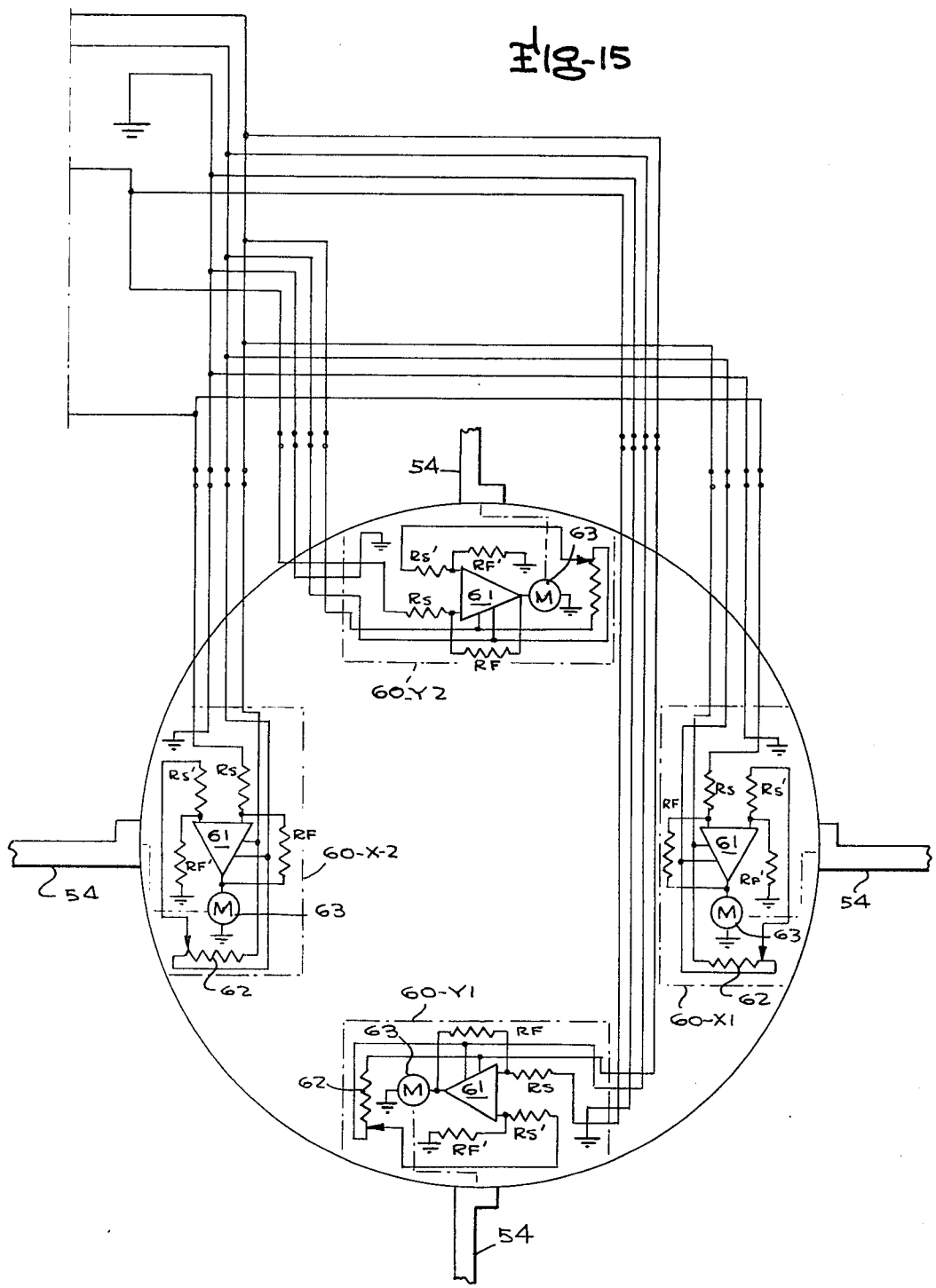
FIG. 15 is a schematic diagram of part of the electrical circuitry for a modified form of the depth controller.

As in alternate embodiment, instead of packaging the servo motors and the electronics together in a sealed cylinder such as the cylinder 31 in the manner illustrated in FIG. 7, the battery packs 35, 36, the electronics mounted on the circuit boards 52, the pressure transducer 37, and the secondary and primary sections of transformers 26-S, 27-S and 28-P may be provided in the sealed cylinder, and a separate servo system may be provided for each diving plane. The circuit connections providing the $E_{px}$ and $E_{py}$ signals from the sliders of transformers 42X and 42Y to the servo units in such an alternate arrangement are illustrated in FIG. 15 which diagrammatically shows the circuit for the servo units, indicated generally by the reference characters 60-X1, 60-X2, 60-Y1 and 60-Y2 associated with the diving plane shafts 54 for the diving planes. The circuitry from the cable 16 to the potentiometers 42X and 42Y is the same as that illustrated in FIG. 8. However, instead of connecting the leads carrying the signals $E_{px}$ and $E_{py}$ to one servo system each, they are in this alternate embodiment connected to two servo systems each, the servo circuits forming each servo unit being the same as the single servo circuit to which the potentiometer signal was applied in the earlier embodiment. For example, the servo unit 60-X1 includes an operational amplifier 61 connected so that the signal $E_{py}$ is applied to its inverting input through a resistor $R_s$, and having a non-inverting input to which a signal is applied from the slider of a follow potentiometer 62 through another isolation resistor $R_{s'}$. The output of the operational amplifier 61 is connected through a feedback resistor $R_f$ to the inverting input and is also connected to a servo motor 63 which mechanically drives the slider of the follow potentiometer 62 and also mechanically drives the diving plane shaft 54 to which the diving plane 30-X1 is connected. The other servo units connected to the diving plane shafts for the other diving planes 30-X2, 30-Y1 and 30-Y2 are each made of differential amplifier and servo motor elements and a follow potentiometer similar to the corresponding components of the servo units 60-X1. In this manner, only interconnecting electrical cables need emerge from the end of the sealed cylinder package similar to the cylinder 31 but of shorter axial length, and these cables terminate at the associated servo unit and connect to the respective components of the servo unit as illustrated schematically in FIG. 15.

While transformers having mating primary and secondary core sections have been illustrated as the preferred means for coupling the various signals between the cable 16 and the components of the depth controller circuitry, it will be apparent that other conventional electrical connector means may be employed.

What is claimed is:

1. A paravane for a seismic cable adapted to be towed substantially horizontally through water, comprising an elongated paravane body having a longitudinal axial bore along the length thereof a size to receive the seismic cable therethrough, means for linking the paravane body to the seismic cable in non-rotatable relation to the cable, a plurality of more than two movable diving planes carried by the paravane body and capable of collectively producing both vertical and horizontal thrusts to cause the paravane to climb to shallower depths or dive to deeper depths regardless of the roll axis orientation of the paravane on the seismic cable, servo means for moving said diving planes to selected attitudes, pressure responsive means disposed in said paravane for producing a depth-indicating signal in response to ambient water pressure, means for producing a depth control signal responsive to command signals transmitted to the paravane, and servo control circuit means for producing activating signals responsive to differences between said depth-indicating signal and depth control signal to activate said servo means to move the diving planes in selected relation to the roll axis orientation of the paravane to cause the paravane to climb or dive to levels producing selected correspondence between said signals without turning of the paravane relative to the yaw axis, said servo control circuit means including gravity actuated potentiometers for varying said activating signals applied to said servo means in selected relation to the vertical gravitational axis to produce movement of said diving planes in correlated relation to the vertical gravitational axis and effect only vertical climbing or diving movement of the paravane in a vertical plane without driving the paravane in lateral directions regardless of the angular orientation of the paravane about the roll axis.

2. A paravane as defined in claim 1, wherein said potentiometers each include a movable slider contact rotatable about the roll axis paralleling the cable axis and having an eccentric mass connected thereto to maintain the slider contact in a fixed selected position relative to the gravitational axis, and said potentiometers having resistance windings extending in a circular path which are held fixed relative to the paravane body.

3. A paravane as defined in claim 1, wherein said diving planes include pivot shafts for rotatably supporting the diving planes at opposite sides of the paravane body for angular movement about pivot axes which extend radially perpendicularly from the center axis of the paravane body, and means providing a driving connection between said servo means and said pivot shafts.

4. A paravane as defined in claim 3, wherein said diving planes include pivot shafts for rotatably supporting the diving planes at opposite sides of the paravane body for angular movement about pivot axes which extend radially perpendicularly from the center axis of the paravane body, and means providing a driving connection between said servo means and said pivot shafts.

5. A paravane for a seismic cable adapted to be towed substantially horizontally through water, comprising an elongated paravane body having a longitudinal axial bore along the length thereof of a size to receive the seismic cable therethrough, means for linking the paravane body to the seismic cable in non-rotatable relation to the cable, a plurality of movable diving planes carried by the paravane body and capable of collectively producing both vertical and horizontal thrusts to cause the paravane to climb to shallower depths or dive to deeper depths regardless of the roll axis orientation of the paravane on the seismic cable, servo means for moving said diving planes to selected attitudes, pressure responsive means disposed in said paravane for producing a depth-indicating signal in response to ambient water pressure, means for producing a depth control signal responsive to command signals transmitted to the paravane, and servo control circuit means for producing activating signals responsive to difference between said depth-indicating signal and depth control signal to activate said servo means to move the diving planes in selected relation to the roll axis orientation of the paravane to cause the paravane to climb or dive to levels producing selected correspondence between said signals without turning of the paravane relative to the yaw axis, said servo control circuit means including a first amplifier means responsive to differences between said signals for producing a first output signal, inverter means connected to said first output signal to produce a second output signal which is an inverted version of said first output signal, a pair of vertical sensing potentiometers, means applying said first and second output signals to diametrically opposite portions of said potentiomers along a circular path and at connection points which are in respective planes perpendicular to each other to generate a pair of said activating signals representing a function of both the deviation of the angular orientation of said paravane from a vertical plane relative the roll axis and of the differences between said depth-indicating signal and said depth control signal, and means for applying said activating signals to said servo means to effect diving or climbing of the paravane without lateral direction change of the paravane course in yaw.

6. A paravane as defined in claim 5, wherein said potentiometers each include a movable slider contact rotatable about the roll axis paralleling the cable axis and having an eccentric mass connected thereto to maintain the slider contact in a fixed selected position relative to the gravitational axis, and said potentiometers having resistance windings extending in a circular path which are held fixed relative to the paravane body.

7. A paravane for a seismic cable adapted to be towed substantially horizontally through water, comprising an elongated paravane body having a longitudinal axial bore along the length thereof a size to receive the seismic cable therethrough, means for linking the paravane body to the seismic cable in non-rotatable relation to the cable, first and second pairs of movable diving planes extending from opposite sides of the paravane body and supported for pivotal movement about first and second transverse diameteric axes disposed at right angles to each other, said diving planes being capable of collectively producing both vertical and horizontal thrusts to cause the paravane to climb to shallower depths or dive to deeper depths regardless of the roll axis orientation of the paravane on the seismic cable, servo means for moving said diving planes about their pivot axes to selected attitudes, pressure responsive means disposed in said paravane for producing a depth-indicating signal in response to ambient water pressure, means for producing a depth control signal responsive to command signals transmitted to the paravane, and servo control circuit means for producing activating signals responsive to differences between said depth-indicating signal and depth control signal to activate said servo means to move the diving planes in selected relation to the roll axis orientation of the paravane to cause the paravane to climb or dive to levels producing selected correspondence between said signals without turning of the paravane relative to the yaw axis, said servo control circuit means including first and second gravity actuated potentiometers respectively associated with said first and second pairs of diving planes for varying said activating signals applied to said servo means in selected relation to the vertical gravitational axis to produce movement of said diving planes in correlated relation to the vertical gravitational axis and effect only vertical climbing or diving movement of the paravane regardless of the angular orientation of the paravane about the roll axis.

8. A paravane as defined in claim 8, wherein said potentiometers each include a movable slider contact rotatable about the roll axis paralleling the cable axis and having an eccentric mass connected thereto to maintain the slider contact in a fixed selected position relative to the gravitational axis, and said potentiometers having resistance windings extending in a circular path which are held fixed relative to the paravane body.

9. A paravane as define in claim 10, wherein said servo control circuit means includes a first amplifier means responsive to differences between said signals for producing a first output signal, inverter means connected to said first output signal to produce a second output signal which is an inverted version of said first output signal, means applying said first and second output signals to the diameterically opposite connection points on said potentiometers to generate a pair of said activating signals representing a function to both the deviation of the angular orientation of said paravane from a vertical plane relative the roll axis and of the differences between said depth-indicating signal and said depth control signal, and means for applying activating signals from said first and second potentiometers to the servo means for said first and second pairs of diving planes in selected relation to effect diving or climbing of the paravane without lateral direction change of the paravane course in yaw.

10. A paravane for a seismic cable adapted to be towed substantially horizontally through water, comprising an elongated paravane body having a longitudinal axial bore along the length thereof of a size to receive the seismic cable therethrough, means for linking the paravane body to the seismic cable in non-rotatable relation to the cable, first and second pairs of movable diving planes extending from opposite sides of the paravane body and supported for pivotal movement about first and second transverse diametric axes disposed at right angles to each other, said diving planes being capable of collectively producing both vertical and horizontal thrusts to cause the paravane to climb to shallower depths or dive to deeper depths regardless of the roll axis orientation of the paravane on the seismic cable, servo means for moving said diving planes about their pivot axes to selected attitudes, pressure responsive means disposed in said paravane for producing a depth-indicating signal in response to ambient water pressure, means for producing a depth control signal responsive to command signals transmitted to the paravane, and servo control circuit means for producing activating signals responsive to differences between said depth-indicating signal and depth control signal to activate said servo means to move the diving planes in selected relation to the roll axis orientation of the paravane to cause the paravane to climb or dive to levels producing selected correspondence between said signals without turning of the paravane relative to the yaw axis, said servo control circuit means including first and second gravity actuated potentiometers respectively associated with said first and second pairs of diving planes for varying said activating signals applied to said servo means in selected relation to the vertical gravitational axis to produce movement of said diving planes in correlated relation to the vertical gravitational axis and effect only vertical climbing or diving movement of the paravane regardless of the angular orientation of the paravane about the roll axis, said potentiometers each including a movable slider contact rotatable about the roll axis paralleling the cable axis and having an eccentric mass connected thereto to maintain the slider contact in a fixed selected position relative to the gravitational axis, and said potentiometers having resistance windings extending in a circular path which are held fixed relative to the paravane body, the servo control circuit means including means for applying signals representing differences between said depth indicating and depth control signals to diametrically opposite connection points on said resistance windings of said potentiometers, the connection points for said first potentiometer being in a diametric plane disposed at right angles to the diameteric plane of the connection points for said second potentiometer.

11. A paravane as defined in claim 10, wherein said diving planes include pivot shafts for rotatably supporting the diving planes at opposite sides of the paravane body for angular movement about diametric pivot axes disposed at right angles to each other which extend radially perpendicularly from the center axis of the paravane body, and means providing a first pair of driving connections between said servo means and the pivot shafts of said first pair of diving planes and providing a second pair of driving connections between said servo means and the pivot shafts of said second pair of diving planes.

12. A paravane as defined in claim 11, wherein said servo control circuit means includes a first amplifier means responsive to differences between said signals for producing a first output signal, inverter means connected to said first output signal to produce a second output signal which is an inverted version of said first output signal, means applying said first and second output signals to diametrically opposite connection points on said potentiometers to generate a pair of said activating signals representing a function of both the deviation of the angular orientation of said paravane from a vertical plane relative the roll axis and of the differences between said depth-indicating signal and said depth control signal, and means for applying activating signals from said first and second potentiometers to the servo means for said first and second pairs of diving planes in selected relation to effect diving or climbing of the paravane without lateral direction change of the paravane course in yaw.

13. A paravane for a seismic cable adapted to be towed substantially horizontally through water, comprising an elongated paravane body having a longitudinal axial bore along the length thereof of a size to receive the seismic cable therethrough, means for linking the paravane body to the seismic cable in non-rotatable relation to the cable, first and second pairs of movable diving planes extending from opposite sides of the paravane body and supported for pivotal movement about first and second transverse diameteric axes disposed at right angles to each other said diving planes being capable of collectively producing both vertical and horizontal thrusts to cause the paravane to climb to shallower depths or dive to deeper depths regardless of the roll axis orientation of the paravane on the seismic cable, servo means for moving said diving planes about their pivot axes to selected attitudes, pressure responsive means disposed in said paravane for producing a depth-indicating signal in response to ambient water pressure, means for producing a depth control signal responsive to command signals transmitted to the paravane, and servo control circuit means for producing activating signals responsive to differences between said depth-indicating signal and depth control signal to activate said servo means to move the diving planes in selected relation to the roll axis orientation of the paravane to cause the paravane to climb or dive to levels producing selected correspondence between said signals without turning of the paravane relative to the yaw axis, said servo control circuit means including a first amplifier means responsive to differences between said signals for producing a first output signal, inverter means connected to said first output signal to produce a second output signal which is an inverted version of said first output signal, a pair of vertical sensing potentiometers, means applying said first and second output signals to diametrically opposite connection points on said potentiometers along a circular path and at connection points which are in respective planes perpendicular to each other to generate a pair of said activating signals representing a function of both the deviation of the angular orientation of said paravane from a vertical plane relative the roll axis and of the differences between said depth-indicating signal and said depth control signal, and means for applying activating signals from said first and second potentiometers to the servo means for said first and second pairs of diving planes in selected relation to effect diving or climbing of the paravane without lateral direction change of the paravane course in yaw.

* * * * *